United States Patent
Chang et al.

(10) Patent No.: US 8,249,392 B2
(45) Date of Patent: Aug. 21, 2012

(54) METHOD FOR ALIGNING POINT CLOUDS

(75) Inventors: Chih-Kuang Chang, Taipei Hsien (TW); Xin-Yuan Wu, Shenzhen (CN); Min Wang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 1062 days.

(21) Appl. No.: 12/178,645

(22) Filed: Jul. 24, 2008

(65) Prior Publication Data
US 2009/0074326 A1    Mar. 19, 2009

(30) Foreign Application Priority Data
Sep. 14, 2007    (CN) .......................... 2007 1 0201702

(51) Int. Cl.
*G06K 9/64*    (2006.01)
*G06T 7/00*    (2006.01)
(52) U.S. Cl. .......................... 382/291; 345/427; 345/630
(58) Field of Classification Search .......................... None
See application file for complete search history.

(56) References Cited

U.S. PATENT DOCUMENTS
7,720,647 B2 *    5/2010    Chang et al. .................. 702/190
2004/0001620 A1 *    1/2004    Moore et al. .................. 382/154

OTHER PUBLICATIONS

Niloy J. Mitra, Natasha Gelfand, Helmut Pottmann, and Leonidas Guibas. 2004. Registration of point cloud data from a geometric optimization perspective. In Proceedings of the 2004 Eurographics/ACM SIGGRAPH symposium on Geometry processing (SGP '04). ACM, New York, NY, USA, 22-31. DOI=10.1145/1057432.1057435 http://doi.acm.org/10.1145/1057432.105743.*

* cited by examiner

*Primary Examiner* — Jason M Repko
*Assistant Examiner* — Thomas A James
(74) *Attorney, Agent, or Firm* — Altis Law Group, Inc.

(57) ABSTRACT

A method for aligning point clouds is disclosed. The method includes inputting point cloud data of a reference object and a to-be-measured object, and confirming an original position of point cloud of the to-be-measured object. The method further includes determining a virtual position of point cloud of the to-be-measured object at each iteration, determining a minimum distance between point cloud of the reference object and point cloud of the to-be-measured object, and determining coordinates of each point in point cloud of the to-be-measured object corresponding to the minimum distance. The method further includes moving each point in point cloud of the to-be-measured object.

6 Claims, 6 Drawing Sheets

METHOD FOR ALIGNING POINT CLOUDS

BACKGROUND OF THE INVENTION

1. Field of the Invention

Embodiments of the present disclosure relate to aligning point clouds, and more particularly to a method for aligning point clouds.

2. Description of Related Art

A point cloud is a set of vertices in a three-dimensional (3D) coordinate system and may be defined by an X, Y, Z coordinate system. Point clouds are often created by a scanning system that measure a large number of points on a surface of an object and output a point cloud as a data file.

Aligning a point cloud of a reference object and a point cloud of a to-be-measured object is often a difficult task. One such system for aligning point clouds is the Geomagic qualify software of PTC company.

However, even though the Geomagic qualify software can align point clouds, it consists of many calculations. As a result, convenience and flexibility are undoubtedly decreased and it is difficult, complex, and time-consuming for Geomagic qualify to offer a robust solution to the above problem.

What is needed, therefore, is a method which can align point clouds, for reducing complexity of calculations and enhancing work efficiency.

SUMMARY OF THE INVENTION

In one aspect, a computer-based method for aligning point clouds is provided. The method includes: (a) inputting data comprising a point cloud data of a reference object and a point cloud data of a to-be-measured object, wherein the point cloud data of the reference object and the point cloud data of the to-be-measured object corresponds to a point cloud of the reference object and to a point cloud of the to-be-measured object respectively; (b) confirming an original position of the point cloud of the to-be-measured object, according to the point cloud data of the reference object and the point cloud data of the to-be-measured object; (c) determining, by using iteration, a virtual position of the point cloud of the to-be-measured object at each iteration according to the original position; (d) determining a minimum distance between the point cloud of the reference object and the point cloud of the to-be-measured object according to the virtual position of the point cloud of the to-be-measured object at a last iteration of block (c), and determining coordinates of each point in the point cloud of the to-be-measured object corresponding to the minimum distance; and (e) moving each point in the point cloud of the to-be-measured object according to the coordinates of a corresponding point calculated in block (d), so as to align the point cloud of the reference object and the point cloud of the to-be-measured object.

Other advantages and novel features will become more apparent from the following detailed description certain embodiments of the present disclosure when taken in conjunction with the accompanying drawings, in which:

DETAILED DESCRIPTION OF THE INVENTION

All of the processes described below may be embodied in, and fully automated via, software code modules executed by one or more general purpose computers or processors. The code modules may be stored in any type of computer-readable medium or other computer storage device. Some or all of the methods may alternatively be embodied in specialized computer hardware.

As used herein, the terms "align point clouds" and "aligning point clouds" define a method of making points in a first point cloud align with points having similar characteristics in a second point cloud as close as possible.

Figure 1:
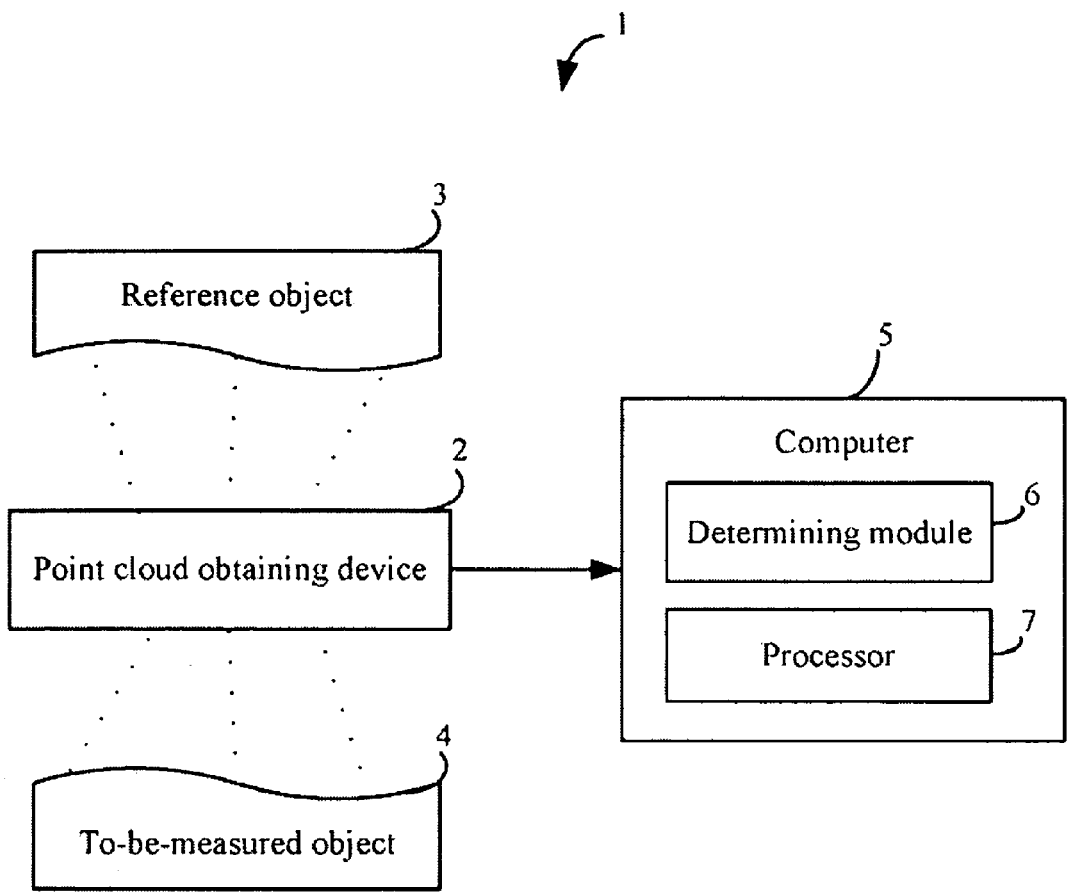
FIG. 1 is a block diagram of one embodiment of a scanning system for aligning point clouds.

FIG. 1 is a block diagram of one embodiment of a scanning system 1 for aligning point clouds.

In one embodiment, the scanning system 1 may include a point cloud obtaining device 2 configured for obtaining a point cloud of a reference object 3 and a point cloud of a to-be-measured object 4, and inputting data of point cloud of the reference object 3 and the to-be-measured object 4 to a computer 5. The scanning system 1 may further include a computer 5 configured for executing software to process the data of two point clouds, such as computer aided verification (CAV), and reverse engineering (RE), for example. The computer 5 comprises a determining module 6 configured for determining various coordinate points for a point cloud. The computer 5 further comprises a processor 7 configured for executing one or more computerized functions for the point cloud obtaining device 2 and the determining module 6.

Figure 2:
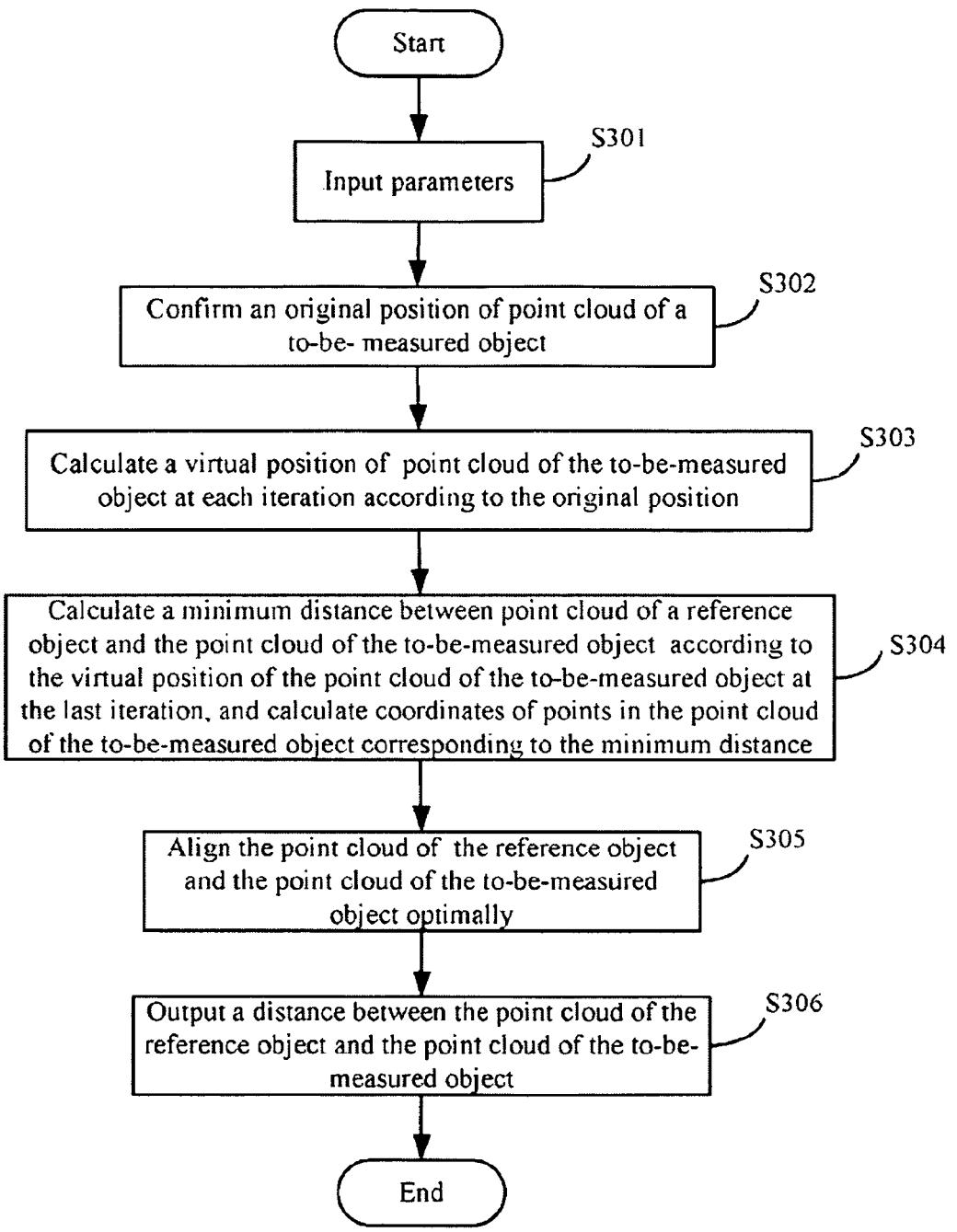
FIG. 2 is a flowchart of one embodiment of a method for aligning point clouds by utilizing the scanning system of FIG. 1.

FIG. 2 is a flowchart illustrating one embodiment of a method for aligning point clouds by utilizing the scanning system of FIG. 1. Depending on the embodiment, additional blocks may be added, others removed, and the ordering of the blocks may be changed.

In block S301, data comprising a point cloud of the reference object 3 (hereinafter "point cloud data of the reference object 3") and data comprising a point cloud of the to-be-measured object 4 (hereinafter "point cloud data of the to-be-measured object 4") obtained by the point cloud obtaining device 2 are inputted to the determining module 5. An aligning accuracy FunX and an aligning step D may be inputted into the determining module 5 as will be further explained below. It may be understood that the point cloud data of the reference object 3 may include coordinates of each point in the point cloud and a total number of the points in the point cloud of the reference object 3. The point cloud data of the to-be-measured object 4 may include coordinates of each point in the point cloud and a total number of the points in the point cloud of the to-be-measured object 4. It may be understood that the aligning accuracy FunX is a degree to be reached when aligning the point cloud of the reference object 3 and the point cloud of the to-be-measured object 4. The aligning step D is a distance to move the point cloud of the to-be-measured object 4 each time when aligning the point cloud of the reference object 3 and the point cloud of the to-be-measured object 4.

In block S302, the determining module 5 confirms an original position of the point cloud of the to-be-measured object 4, according to the point cloud data of the reference object 3 and the point cloud data of the to-be-measured object 4. The original position of the point cloud of the to-be-measured object 4 is a position based on the position of the point cloud of the reference object 3. The original position of the point cloud of the to-be-measured object 4 is also a relative position to the position of the point cloud of the reference object 3 as will be further explained herein with respect to FIG. 3.

In block S303, the determining module 5 determines a virtual position of the point cloud of the to-be-measured object 4 at each iteration according to the original position using an iterative method. In one embodiment, the determining module 5 obtains part of the point cloud data of the to-be-measured object 4 at each iteration, and calculates a virtual position of the point cloud of the to-be-measured object 4 according to the part of the point cloud data of the to-be-measured object 4 as will be further described with respect to FIG. 4.

In block S304, the determining module 5 determines a minimum distance between the point cloud of the reference object 3 and the point cloud of the to-be-measured object 4 according to the virtual position of the point cloud of the to-be-measured object 4 at a last iteration of the iterative method. Furthermore, the determining module 5 determines coordinates of each point in the point cloud of the to-be-measured object 4 corresponding to the minimum distance as will be further explained with respect to FIG. 6.

In block S305, the determining module 5 moves each point in the point cloud of the to-be-measured object 4 according to the coordinates of a corresponding point calculated in block S304, so as to align the point cloud of the reference object 3 and the point cloud of the to-be-measured object 4.

In block S306, the determining module 5 outputs a distance between the point cloud of the reference object 3 and the point cloud of the to-be-measured object 4 after aligning them.

Figure 3:
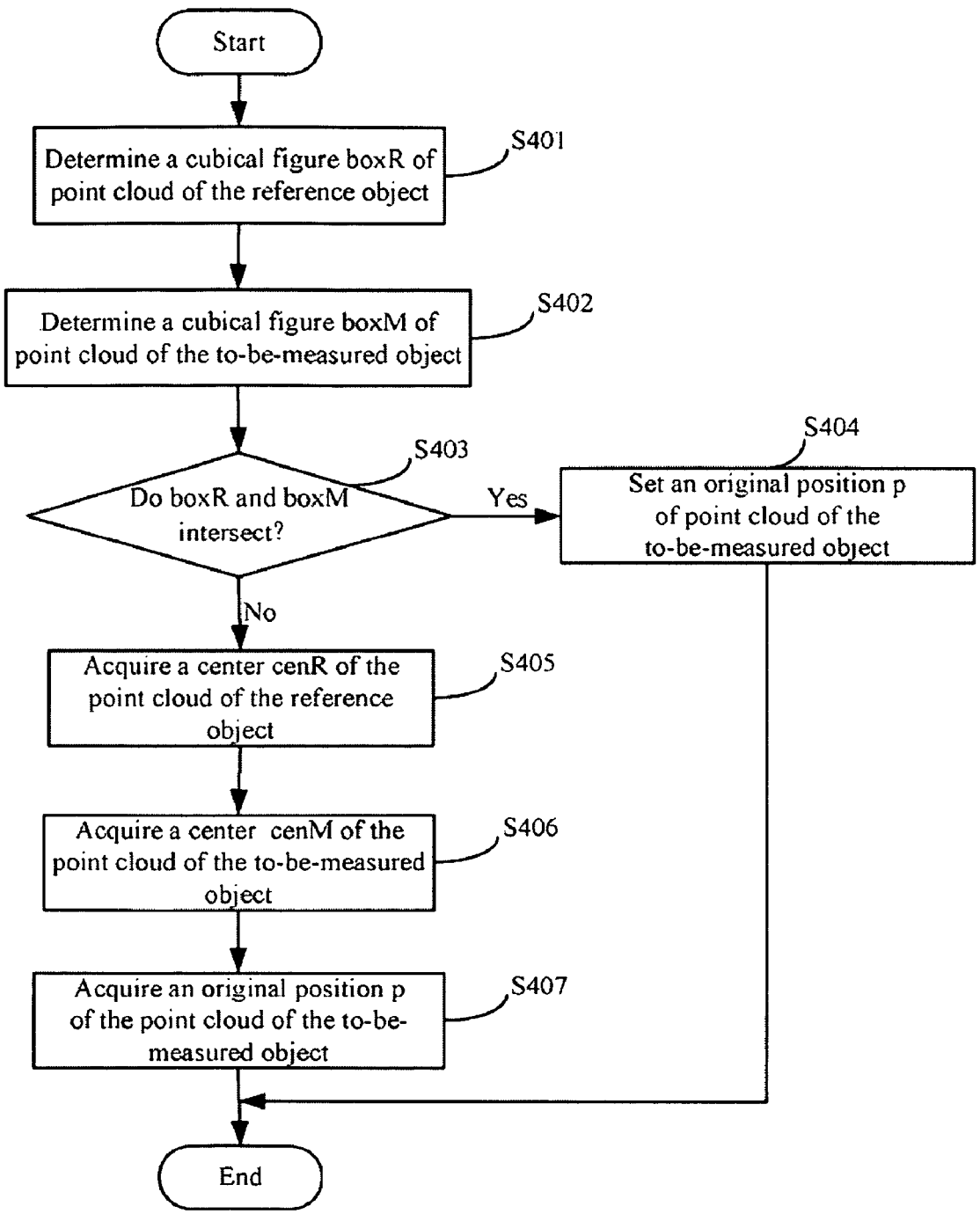
FIG. 3 is a flowchart of one embodiment of a method detailing block S302 of FIG. 2.

FIG. 3 is a flowchart of one embodiment of a method detailing block S302 of FIG. 2. Depending on the embodiment, additional blocks may be added, others removed, and the ordering of the blocks may be changed.

In block S401, the determining module 5 determines a cubical figure boxR of the point cloud of the reference object 3. Firstly, the determining module 5 identifies an outermost point for each surface edge of the point cloud of the reference object 3 by analyzing coordinates of an outermost point on each of the surface edges of the point cloud of the reference object 3. It may be understood that a point cloud of the reference object 3 consists of a plurality of points. The determining module 5 recursively compares coordinates of all points of the point cloud of the reference object 3 and obtains the outermost points of the point cloud of the reference object 3. Secondly, the determining module 5 determines the cubical figure boxR by taking (pt1Min[x], pt1Min[y], pt1Min[z]), (pt1Min[x], pt1Min[y], pt1Max[z]), (pt1Min[x], pt1Max[y], pt1Min[z]), (pt1Min[x], pt1Max[y], pt1Max[z]), (pt1Max[x], pt1Max[y], pt1Max[z]), (pt1Max[x], pt1Max[y], pt1Min[z]), (pt1Max[x], pt1Min[y], pt1Max[z]), (pt1Max[x], pt1Min[y], pt1Min[z]) for example here that confines the point cloud of the reference object 3.

In block S402, the determining module 5 determines a cubical figure boxM of the point cloud of the to-be-measured object 4. Firstly, the determining module 5 identifies the outermost point on each of surface edges of the point cloud of the to-be-measured object 4 by analyzing coordinates of the outermost point on each of the surface edges of the point cloud of the to-be-measured object 4. As mentioned above, the point cloud of the to-be-measured object 4 consists of a plurality of points. The determining module 5 compares coordinates of all the points of the point cloud of the to-be-measured object 4 recursively and obtains the outermost points of the point cloud of the to-be-measured object 4. Secondly, the determining module 5 determines the cubical figure boxM by taking (pt2Min[x], pt2Min[y], pt2Min[z]), (pt2Min[x], pt2Min[y], pt2Max[z]), (pt2Min[x], pt2Max[y], pt2Min[z]), (pt2Min[x], pt2Max[y], pt2Max[z]), (pt2Max[x], pt2Max[y], pt2Max[z]), (pt2Max[x], pt2Max[y], pt2Min[z]), (pt2Max[x], pt2Min[y], pt2Max[z]), (pt2Max[x], pt2Min[y], pt2Min[z]) for example here that confines the point cloud of the to-be-measured object 4.

In block S403, the determining module 5 determines whether boxR and boxM intersect. In detail, first, the determining module 5 obtains a greater value fMinB[x] from pt1Min[x] and pt2Min[x], and a smaller value fMaxB[x] from pt1Max[x] and pt2Max[x]. Second, the determining module 5 compares fMinB[x] with fMaxB[x]. If fMinB[x] is greater than or equal to fMaxB[x], boxR and boxM do not intersect. Otherwise, if fMinB[x] is smaller than fMaxB[x], boxR and boxM intersect. In the same way, the determining module 5 may obtain fMinB[y] and fMaxB[y], or fMinB[z] and fMaxB[z], and may determine whether boxR and boxM intersect, by comparing fMinB[y] with fMaxB[y], or comparing fMinB[z] with fMaxB[z].

If boxR and boxM intersect, in block S404, the determining module 5 sets an original position p (p[0], p[1], p[2], p[3], p[4], p[5]): p[0]=0, p[1]=0, p[2]=0, p[3]=0, p[4]=0, p[5]=0 of the point cloud of the to-be-measured object 4.

Otherwise, if boxR and boxM do not intersect, in block S405, the determining module 5 acquires a center cenR (cenR[x], cenR[y], cenR[z]) of the point cloud of the reference object 3, according to the coordinates of each point and the total number of the points in the point cloud of the reference object 3. In this process, the determining module 5 obtains all the x-axis coordinates of each point in the point cloud of the reference object 3. Second, the determining module 5 acquires cenR[x] by adding all the x-axis coordinates and dividing the result by the total number of the points. In a same sense, cenR[y] and cenR[z] can be acquired.

In block S406, the determining module 5 acquires a center cenM (cenM[x], cenM[y], cenM[z]) of the point cloud of the to-be-measured object 4, according to the coordinates of each point and the total number of the points in the point cloud of the to-be-measured object 4 (referring to block S405).

In block S407, the determining module 5 acquires an original position p of the point cloud of the to-be-measured object 4 as follows: p[0]=cenM[x]−cenR[x], p[1]=cenM[y]−cenR[y], p[2]=cenM[z]−cenR[z], p[3]=angleX, p[4]=angleY, p[5]= angleZ. angleX denotes an angle between a line determined by the point cenM and the point cenR and the positive direction of x-axis. angleY denotes an angle between a line determined by the point cenM and the point cenR and the positive direction of y-axis. angleZ denotes an angle between a line determined by the point cenM and the point cenR and the positive direction of z-axis.

Figure 4:
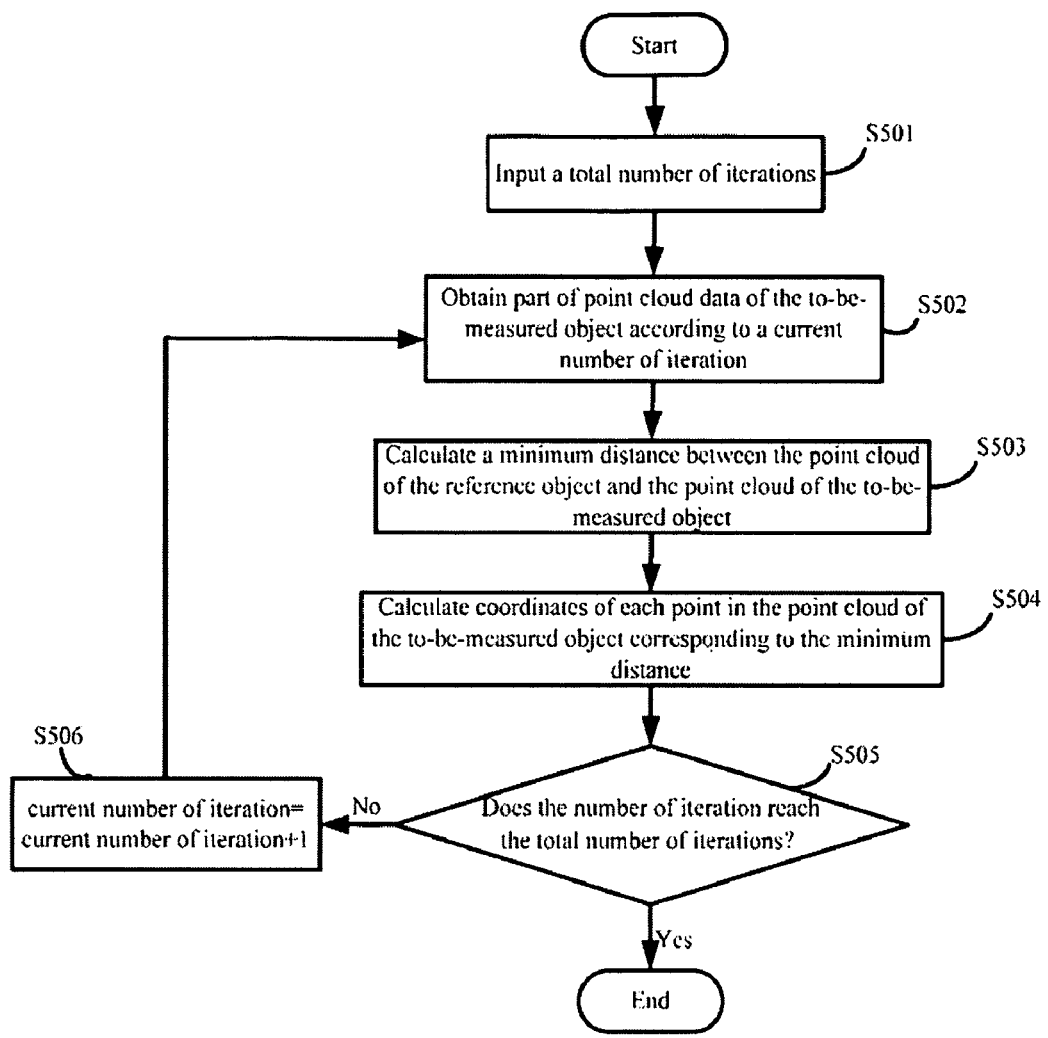
FIG. 4 is a flowchart of one embodiment of a method detailing block S303 of FIG. 2.

FIG. 4 is a flowchart of one embodiment of a method detailing block S303 of FIG. 2. Depending on the embodiment, additional blocks may be added, others removed, and the ordering of the blocks may be changed.

In block S501, a total number of iterations may be inputted into the determining module 5. In one embodiment, m denotes the total number of iterations, i denotes a current number of iteration. For the purpose of illustration, m=4.

In block S502, the determining module 5 obtains part n of point cloud data of the to-be-measured object 4, according to a current number of iteration and the total number of the points in point cloud of the to-be-measured object 4. In one particular embodiment, when i=1, the determining module 5 may uniformly obtains points in the point cloud of the to-bemeasured object 4 according to a proportion of 100:1, then n equals the total number of the points in the point cloud of the to-be-measured object *1/100. In another particular embodiment, when i=2, the determining module 5 may uniformly obtains points in the point cloud of the to-be-measured object 4 according to a proportion of 100:5, then n equals the total number of the points in the point cloud of the to-be-measured object *5/100. In another particular embodiment, when i=3, the determining module 5 may uniformly obtains points in the point cloud of the to-be-measured object 4 according to a proportion of 10:1, then n equals the total number of the points in the point cloud of the to-be-measured object *1/10. In another particular embodiment, when i=4, the determining module 5 may uniformly obtains points in the point cloud of the to-be-measured object 4 according to a proportion of 10:3, then n equals the total number of the points in the point cloud of the to-be-measured object *3/10.

Figure 5:
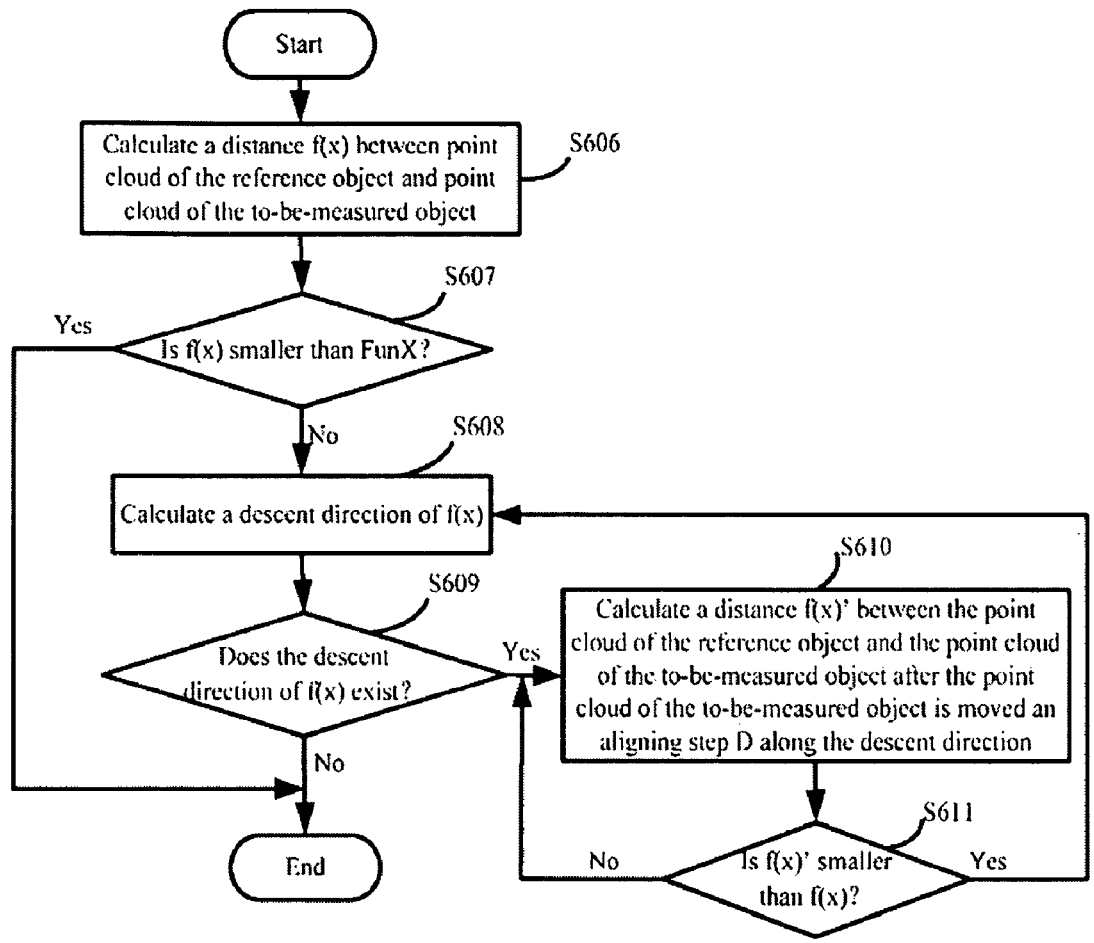
FIG. 5 is a flowchart of one embodiment of a method detailing block S503 of FIG. 4.

In block S503, the determining module 5 calculates a minimum distance between the point cloud of the reference object 3 and the point cloud of the to-be-measured object 4, according to n and a virtual position of the point cloud of the to-be-measured object 4 corresponding to n (details are described in FIG. 5). The virtual position of the point cloud of the to-be-measured object 4 is the original position of the point cloud of the to-be-measured object 4 when i=1. In one particular embodiment, when i=1, the determining module 5 may determine a virtual position (called virtual position 1 here) of the point cloud of the to-be-measured object 4 at a next iteration, according to the points obtained when i=1 in block S502 and the original position of the point cloud of the to-be-measured object 4. In another particular embodiment, when i=2, the determining module 5 may determine a virtual position (called virtual position 2 here) of the point cloud of the to-be-measured object 4 at a next iteration, according to the points obtained when i=2 in block S502 and the virtual position 1 of the point cloud of the to-be-measured object 4. In another particular embodiment, when i=3, the determining module 5 may determine a virtual position (called virtual position 3 here) of the point cloud of the to-be-measured object 4 at a next iteration, according to the points obtained when i=3 in block S502 and the virtual position 2 of the point cloud of the to-be-measured object 4. In another particular embodiment, when i=4, the determining module 5 may determine a virtual position (called virtual position 4 here) of the point cloud of the to-be-measured object 4 at a next iteration, according to the points obtained when i=4 in block S502 and the virtual position 3 of the point cloud of the to-be-measured object 4.

In block S504, the determining module 5 calculates coordinates of each point in the point cloud of the to-be-measured object 4 corresponding to the minimum distance. The determining module 5 calculates a virtual position of the point cloud of the to-be-measured object 4 as a virtual position at the next iteration according to the coordinates.

In block S505, the determining module 5 determines whether the current number of iteration reaches the total number of iterations. If the current number of iteration reaches the total number of iterations, in other words, if i=m, the procedure ends.

Otherwise, if the current number of iteration does not reach the total number of iterations, in other words, if i is less than or equal to m, in block S506, i is evaluated as i+1, the procedure returns to the block S502.

FIG. 5 is a flowchart of one embodiment of a method detailing block S503 of FIG. 2. Depending on the embodiment, additional blocks may be added, others removed, and the ordering of the blocks may be changed. Depending on the embodiment, additional blocks may be added, others removed, and the ordering of the blocks may be changed.

In block S606, the determining module 5 determines a distance f(x) between the point cloud of the reference object 3 and the point cloud of the to-be-measured object 4, according to coordinates of each point in the point cloud of the to-be-measured object 4. In one embodiment, f(x) may be according to the following formula:

$$f(x) = \sqrt{\mathrm{Min}\frac{\sum_{n=1}^{n}\left(\sqrt{(\mathrm{pt1}'[x]-\mathrm{pt2}[x])^2+(\mathrm{pt1}'[y]-\mathrm{pt2}[y])^2+(\mathrm{pt1}'[z]-\mathrm{pt2}[z])^2}\right)^2}{n}}.$$

In the above formula, n is part of point cloud data of the to-be-measured object 4 obtained in the block S502. (pt1'[x], pt1'[y], pt1'[z]) are coordinates calculated according to coordinates of each point obtained in the block S502. (pt2[x], pt2[y], pt2[z]) are coordinates of a point that has the least distance to the point (pt1'[x], pt1'[y], pt1'[z]) in point cloud of the reference object 3. (pt1'[x], pt1'[y], pt1'[z])=move*(move2*(mat*movex1)), mat=move1*matx*maty*matz. move1 denotes original coordinates of each point obtained in the block S502.

Detailed steps are as following:

$$(pt1'[x], pt1'[y], pt1'[z]) = \begin{Bmatrix} pt1'[x] \\ pt1'[y] \\ pt1'[z] \\ 1 \end{Bmatrix},$$

$$move1 = \begin{Bmatrix} 1 & 0 & 0 & -cenM[x] \\ 0 & 1 & 0 & -cenM[y] \\ 0 & 0 & 1 & -cenM[z] \\ 0 & 0 & 0 & 1 \end{Bmatrix},$$

$$matx = \begin{Bmatrix} 1 & 0 & 0 & 0 \\ 0 & \cos(angleX) & -\sin(angleX) & 0 \\ 0 & \sin(angleX) & \cos(angleX) & 0 \\ 0 & 0 & 0 & 1 \end{Bmatrix},$$

$$maty = \begin{Bmatrix} \cos(angleY) & 0 & \sin(angleY) & 0 \\ 0 & 1 & 0 & 0 \\ -\sin(angleY) & 0 & \cos(angleY) & 0 \\ 0 & 0 & 0 & 1 \end{Bmatrix},$$

$$matz = \begin{Bmatrix} \cos(angleZ) & -\sin(angleZ) & 0 & 0 \\ \sin(angleZ) & \cos(angleZ) & 0 & 0 \\ 0 & 0 & 1 & 0 \\ 0 & 0 & 0 & 1 \end{Bmatrix},$$

-continued $$move2 = \begin{Bmatrix} 1 & 0 & 0 & cenM[x] \\ 0 & 1 & 0 & cenM[y] \\ 0 & 0 & 1 & cenM[z] \\ 0 & 0 & 0 & 1 \end{Bmatrix},$$

$$move = \begin{Bmatrix} 1 & 0 & 0 & p[0] \\ 0 & 1 & 0 & p[1] \\ 0 & 0 & 1 & p[2] \\ 0 & 0 & 0 & 1 \end{Bmatrix},$$

$$movex1 = \begin{Bmatrix} pt1[x] \\ pt1[y] \\ pt1[z] \\ 1 \end{Bmatrix}.$$

In block S607, the determining module 5 determines whether f(x) is smaller than the aligning accuracy FunX. If f(x) is smaller than FunX, then the procedure ends.

Otherwise, if f(x) is not smaller than FunX, in block S608, then the determining module 5 calculates a descent direction of f(x). It may be understood that the descent direction of f(x) is a direction toward which the value of f(x) decreases.

In block S609, the determining module 5 determines whether the descent direction of f(x) exists. If the descent direction of f(x) doesn't exist, the procedure ends.

Otherwise, if the descent direction of f(x) exists, in block S610, the determining module 5 calculates a distance f(x)' between the point cloud of the reference object 3 and the point cloud of the to-be-measured object 4, after the point cloud of the to-be-measured object 4 being moved an aligning step D along the descent direction. In detail, firstly the determining module 5 calculates a virtual position of the point cloud of the to-be-measured object 4 after being moved an aligning step D along the descent direction. Then, the determining module 5 calculates a distance f(x)' between the point cloud of the reference object 3 and the point cloud of the to-be-measured object 4 according to the virtual position (referring to block S606).

In block S611, the determining module 5 determines whether f(x)' is smaller than f(x). If f(x)' is smaller than f(x), then the procedure returns to block S608. Otherwise, if f(x)' is not smaller than f(x), then the procedure returns to block S610.

Figure 6:
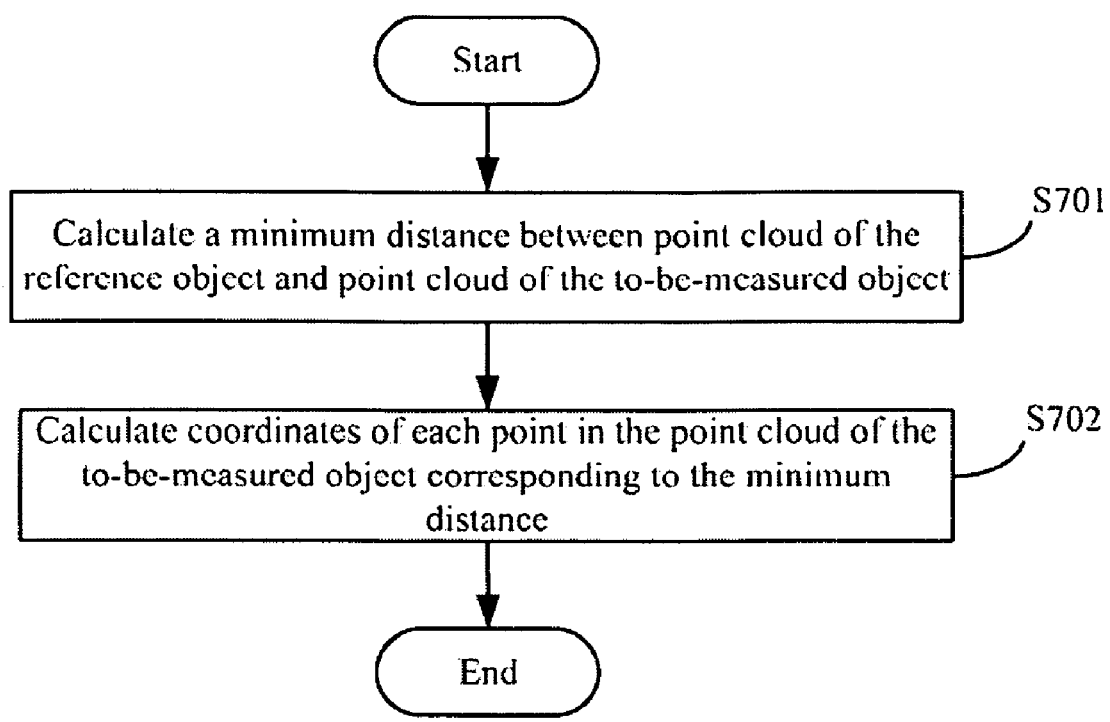
FIG. 6 is a flowchart of one embodiment of a method detailing block S304 of FIG. 2.

FIG. 6 is a flowchart of one embodiment of a method detailing block S304 of FIG. 2. Depending on the embodiment, additional blocks may be added, others removed, and the ordering of the blocks may be changed.

In block S701, the determining module 5 calculates a minimum distance between the point cloud of the reference object 3 and the point cloud of the to-be-measured object 4, according to the virtual position of the point cloud of the to-be-measured object 4 calculated at the last iteration in block S504 (referring to block S503).

In block S702, the determining module 5 calculates coordinates of each point in the point cloud of the to-be-measured object 4 corresponding to the minimum distance.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A computer-based method for aligning point clouds, the method comprising:
   (a) inputting data comprising a point cloud data of a reference object and a point cloud data of a to-be-measured object, wherein the point cloud data of the reference object and the point cloud data of the to-be-measured object corresponds to a point cloud of the reference object and to a point cloud of the to-be-measured object respectively;
   (b) confirming an original position of the point cloud of the to-be-measured object, according to the point cloud data of the reference object and the point cloud data of the to-be-measured object, comprising:
       determining a cubical figure boxR of the point cloud of the reference object;
       determining a cubical figure boxM of the point cloud of the to-be-measured object;
       setting an original position of the point cloud of the to-be-measured object, when boxR and boxM intersect; and
       determining a center of the point cloud of the reference object, determining a center of the point cloud of the to-be-measured object, and determining an original position of the point cloud of the to-be-measured object according to the center of the point cloud of the reference object and the center of the point cloud of the to-be-measured object upon the condition that the boxR and the boxM do not intersect;
   (c) determining, by using iteration, a virtual position of the point cloud of the to-be-measured object at each iteration according to the original position;
   (d) determining a minimum distance between the point cloud of the reference object and the point cloud of the to-be-measured object according to the virtual position of the point cloud of the to-be-measured object at a last iteration of step (c), and determining coordinates of each point in the point cloud of the to-be-measured object corresponding to the minimum distance; and
   (e) moving each point in the point cloud of the to-be-measured object according to the coordinates of a corresponding point calculated in step (d), so as to align the point cloud of the reference object and the point cloud of the to-be-measured object.

2. The method according to claim 1, further comprising:
   (f) outputting a distance between the point cloud of the reference object and the point cloud of the to-be-measured object after aligning the point cloud of the reference object and the point cloud of the to-be-measured object.

3. The method according to claim 1, wherein step (c) comprises:
   (c1) inputting a total number of iterations into the determining module;
   (c2) obtaining part of the point cloud data of the to-be-measured object according to a current number of iteration;
   (c3) determining a minimum distance between the point cloud of the reference object and the point cloud of the to-be-measured object, according to a virtual position of the point cloud of the to-be-measured object corresponding to the part of the point cloud data of the to-be-measured object, the virtual position of the point cloud of the to-be-measured object being the original position of the point cloud of the to-be-measured object if the current number of iteration is 1;

(c4) determining a virtual position of the point cloud of the to-be-measured object corresponding to the minimum distance as a virtual position at the next iteration; and (c5) repeating the steps from (c2) to (c4), until the current number of iteration reaches the total number of iterations.

4. The method according to claim 3, wherein step (c3) comprises:

(c31) determining a distance f(x) between the point cloud of the reference object and the point cloud of the to-be-measured object, according to the point cloud data of the to-be-measured object;

(c32) determining a descent direction of f(x), if f(x) is not smaller than a preset aligning accuracy;

(c33) determining a distance f(x)' between the point cloud of the reference object and the point cloud of the to-be-measured object after the point cloud of the to-be-measured object being moved a preset aligning step D along the descent direction, if the descent direction of f(x) exists;

(c34) returning to step (c33), if f(x)' is not smaller than f(x); and (c35) returning to step (c32), if f(x)' is smaller than f(x).

5. The method according to claim 1, wherein step (d) comprises:

determining a minimum distance between the point cloud of the reference object and the point cloud of the to-be-measured object, according to the virtual position of the point cloud of the to-be-measured object calculated at the last iteration in step (c);

determining coordinates of each point in the point cloud of the to-be-measured object corresponding to the minimum distance.

6. A non-transitory computer-readable medium having stored thereon instructions for aligning point clouds, the computer-readable medium, when executed by a computer, causes the computer to:

(a) input data comprising a point cloud data of a reference object and a point cloud data of a to-be-measured object, wherein the point cloud data of the reference object and the point cloud data of the to-be-measured object corresponds to a point cloud of the reference object and to a point cloud of the to-be-measured object respectively;

(b) confirm an original position of the point cloud of the to-be-measured object, according to the point cloud data of the reference object and the point cloud data of the to-be-measured object; comprising:

determine a cubical figure boxR of the point cloud of the reference object;

determine a cubical figure boxM of the point cloud of the to-be-measured object;

set an original position of the point cloud of the to-be-measured object, when boxR and boxM intersect; and determine a center of the point cloud of the reference object, determine a center of the point cloud of the to-be-measured object, and determine an original position of the point cloud of the to-be-measured object according to the center of the point cloud of the reference object and the center of the point cloud of the to-be-measured object upon the condition that the boxR and the boxM do not intersect;

(c) determine, by using iteration, a virtual position of the point cloud of the to-be-measured object at each iteration according to the original position;

(d) determine a minimum distance between the point cloud of the reference object and the point cloud of the to-be-measured object according to the virtual position of the point cloud of the to-be-measured object at a last iteration of step (c), and determining coordinates of each point in the point cloud of the to-be-measured object corresponding to the minimum distance; and (e) move each point in the point cloud of the to-be-measured object according to the coordinates of a corresponding point calculated in step (d), so as to align the point cloud of the reference object and the point cloud of the to-be-measured object.

* * * * *